United States Patent
Ito et al.

(10) Patent No.: US 10,661,872 B1
(45) Date of Patent: May 26, 2020

(54) SYSTEM FOR AND METHOD OF CONTROLLING WATERCRAFT

(71) Applicant: YAMAHA HATSUDOKI KABUSHIKI KAISHA, Iwata-shi, Shizuoka (JP)

(72) Inventors: Makoto Ito, Shizuoka (JP); Yoshikazu Nakayasu, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 16/219,991

(22) Filed: Dec. 14, 2018

Related U.S. Application Data

(60) Provisional application No. 62/607,422, filed on Dec. 19, 2017.

(51) Int. Cl.
| | |
|---|---|
| *B63H 20/12* | (2006.01) |
| *B63H 25/24* | (2006.01) |
| *B63H 20/00* | (2006.01) |
| *G05D 1/02* | (2020.01) |
| *B63H 21/21* | (2006.01) |

(52) U.S. Cl.
CPC ........... *B63H 21/265* (2013.01); *B63H 20/12* (2013.01); *B63H 25/24* (2013.01); *G05D 1/0206* (2013.01); *B63H 2020/003* (2013.01); *B63H 2021/216* (2013.01)

(58) Field of Classification Search
CPC ....... B63H 20/12; B63H 25/24; B63H 21/265
See application file for complete search history.

(56) References Cited

U.S. PATENT DOCUMENTS

| | | | | |
|---|---|---|---|---|
| 8,192,239 | B2* | 6/2012 | Ito .......................... | B63H 21/22 440/1 |
| 10,518,857 | B2* | 12/2019 | Mizutani ................ | B63H 25/52 |
| 2015/0246714 | A1* | 9/2015 | Morikami .............. | B63H 25/42 701/21 |

FOREIGN PATENT DOCUMENTS

JP      2014-76761 A     5/2014

* cited by examiner

*Primary Examiner* — Lars A Olson
*Assistant Examiner* — Jovon E Hayes
(74) *Attorney, Agent, or Firm* — Keating and Bennett, LLP

(57) ABSTRACT

In a watercraft propulsion system, when a magnitude of a command value indicated by a propulsion signal falls within a first range in a composite operation, a controller controls a first outboard motor to increase a thrust in a propulsion direction and simultaneously causes a second outboard motor to reduce a thrust in an opposite direction. When the magnitude of the command value falls within a second range in the composite operation, the controller controls the first outboard motor to make the thrust in the propulsion direction greater than when the magnitude of the command value falls within the first range and simultaneously maintains the second outboard motor in a neutral state. When the magnitude of the command value falls within a third range in the composite operation, the controller controls the first outboard motor to make the thrust in the propulsion direction greater than when the magnitude of the command value falls within the second range and simultaneously controls the second outboard motor to generate a thrust in the propulsion direction.

14 Claims, 16 Drawing Sheets

SYSTEM FOR AND METHOD OF CONTROLLING WATERCRAFT

CROSS REFERENCE TO RELATED APPLICATIONS

This application claims the benefit of priority to U.S. Patent Application No. 62/607,422 filed on Dec. 19, 2017. The entire contents of this application are hereby incorporated herein by reference.

BACKGROUND OF THE INVENTION

1. Field of the Invention

The present invention relates to a system for and a method of controlling a watercraft.

2. Description of the Related Art

A type of control system has been known to control the magnitude and direction of a thrust generated by each of a plurality of outboard motors so as to turn the bow of a watercraft. For example, a control device for outboard motors described in Japan Laid-open Patent Application Publication No. JP2014-76761A controls right and left outboard motors in accordance with a twist operation of a joystick. Specifically, when the joystick is twisted rightward, the control device causes the outboard motor disposed on the port side to generate a thrust for forward movement, and simultaneously, causes the outboard motor disposed on the starboard side to generate a thrust for rearward movement. Accordingly, the watercraft turns the bow rightward.

In some situations, such as, adjusting the position and direction of a watercraft, an operator wants to move the watercraft forward (or rearward) while turning the bow of the watercraft. In such a situation, the aforementioned control device requires the operator to be skilled in performing bow turning and forward (or rearward) movement simultaneously.

When the watercraft is moved forward (or rearward) while bow turning thereof is ongoing, it can be also assumed to cause each of the right and left outboard motors to generate a thrust for forward (or rearward) movement, and simultaneously, change the rudder angle thereof. Accordingly, the watercraft can be turned rightward and leftward, while being moved forward (or rearward).

In such a case, however, when only bow turning of the watercraft is performed and when the watercraft is moved forward (or rearward) while bow turning thereof is ongoing, the direction of the thrust generated by one of the outboard motors is abruptly switched between forward and rearward directions. Accordingly, the thrust changes in a non-continuous manner. Hence, the operator is required to be skilled in performing operations such as adjustment in velocity and direction of the watercraft.

SUMMARY OF THE INVENTION

Preferred embodiments of the present invention provide easy operations to adjust velocity and direction of a watercraft when the watercraft is moved forward or rearward while bow turning thereof is ongoing.

A system according to a first preferred embodiment of the present invention is a system used in controlling a watercraft which includes a left outboard motor, a right outboard motor and a controller. The left outboard motor is disposed on a port side of the watercraft. The right outboard motor is disposed on a starboard side of the watercraft. The controller communicates with the right outboard motor and the left outboard motor.

The controller receives a bow turning signal that causes the watercraft to turn a bow thereof and a propulsion signal that causes the watercraft to move forward and rearward. When receiving the bow turning signal, the controller causes one of the right and left outboard motors to generate a forward thrust and simultaneously causes the other of the right and left outboard motors to generate a rearward thrust in accordance with a bow turning direction indicated by the bow turning signal.

A first outboard motor is one of the right and left outboard motors that generates a thrust in a propulsion direction indicated by the propulsion signal, while a second outboard motor is the other of the right and left outboard motors that generates a thrust in an opposite direction to the propulsion direction. When a magnitude of a command value indicated by the propulsion signal falls within a first range in a composite operation in which the controller receives the bow turning signal and the propulsion signal, the controller controls the first outboard motor to increase the thrust in the propulsion direction and simultaneously controls the second outboard motor to reduce the thrust in the opposite direction.

When the magnitude of the command value falls within a second range greater than the first range in the composite operation, the controller controls the first outboard motor to make the thrust in the propulsion direction greater than when the magnitude of the command value falls within the first range and simultaneously maintains the second outboard motor in a neutral state. Also, when the magnitude of the command value falls within a third range greater than the second range in the composite operation, the controller controls the first outboard motor to make the thrust in the propulsion direction greater than when the magnitude of the command value falls within the second range and simultaneously controls the second outboard motor to generate a thrust in the propulsion direction.

A method according to a second preferred embodiment of the present invention is a method of controlling a watercraft including a left outboard motor disposed on a port side of the watercraft and a right outboard motor disposed on a starboard side of the watercraft, and includes the following processing.

First processing refers to receiving a bow turning signal that causes the watercraft to turn a bow thereof and a propulsion signal that causes the watercraft to move forward or rearward. Second processing refers to causing one of the right and left outboard motors to generate a forward thrust and simultaneously causing the other of the right and left outboard motors to generate a rearward thrust in accordance with a bow turning direction indicated by the bow turning signal when the bow turning signal is received.

Third processing refers to controlling a first outboard motor to increase a thrust in a propulsion direction and simultaneously controlling a second outboard motor to reduce a thrust in an opposite direction when a magnitude of a command value indicated by the propulsion signal falls within a first range in a composite operation in which the bow turning signal and the propulsion signal are received.

Fourth processing refers to controlling the first outboard motor to make the thrust in the propulsion direction greater than when the magnitude of the command value falls within the first range and simultaneously maintaining the second outboard motor in a neutral state when the magnitude of the command value falls within a second range greater than the first range in the composite operation.

Fifth processing refers to controlling the first outboard motor to make the thrust in the propulsion direction greater than when the magnitude of the command value falls within the second range and simultaneously controlling the second outboard motor to generate a thrust in the propulsion direction when the magnitude of the command value falls within a third range greater than the second range in the composite operation.

According to preferred embodiments of the present invention, when a watercraft is propelled forward or rearward while bow turning thereof is ongoing, the thrust in the propulsion direction generated by the first outboard motor increases as the magnitude of the command value indicated by the propulsion signal changes to sequentially fall within the first range, the second range, and then the third range. Additionally, the direction of the thrust generated by the second outboard motor is switched to the propulsion direction from the direction opposite to the propulsion direction via the neutral state as the magnitude of the command value indicated by the propulsion signal changes to sequentially fall within the first range, the second range, and then the third range. Therefore, balance in thrust between the first outboard motor and the second outboard motor continuously changes in accordance with a change in magnitude of the command value indicated by the propulsion signal. Accordingly, adjustment of vessel velocity and direction of the watercraft is able to be easily performed.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
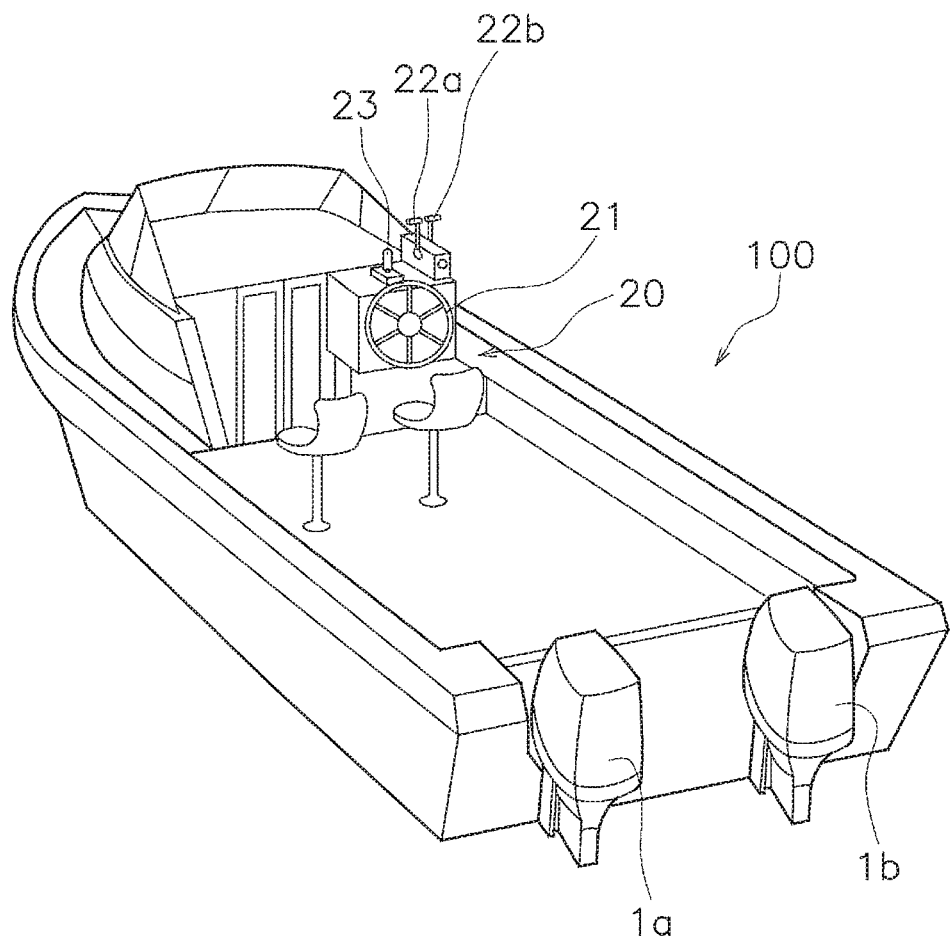
FIG. 1 is a schematic diagram of a watercraft in which a watercraft control system according to a preferred embodiment of the present invention is included.

Preferred embodiments of the present invention will be hereinafter explained with reference to the drawings. FIG. 1 is a schematic diagram of a watercraft 100 in which a control system according to a preferred embodiment is embedded. As shown in FIG. 1, the control system includes a plurality of outboard motors 1a and 1b. Specifically, the watercraft 100 includes a left outboard motor 1a and a right outboard motor 1b.

The outboard motors 1a and 1b are preferably attached to the stern of the watercraft 100. The outboard motors 1a and 1b are positioned in alignment in the width direction of the watercraft 100. Specifically, the left outboard motor 1a is preferably disposed on the port side of the watercraft 100 and the right outboard motor 1b is preferably disposed on the starboard side of the watercraft 100. Each of the outboard motors 1a and 1b generates a thrust to propel the watercraft 100.

Figure 2:
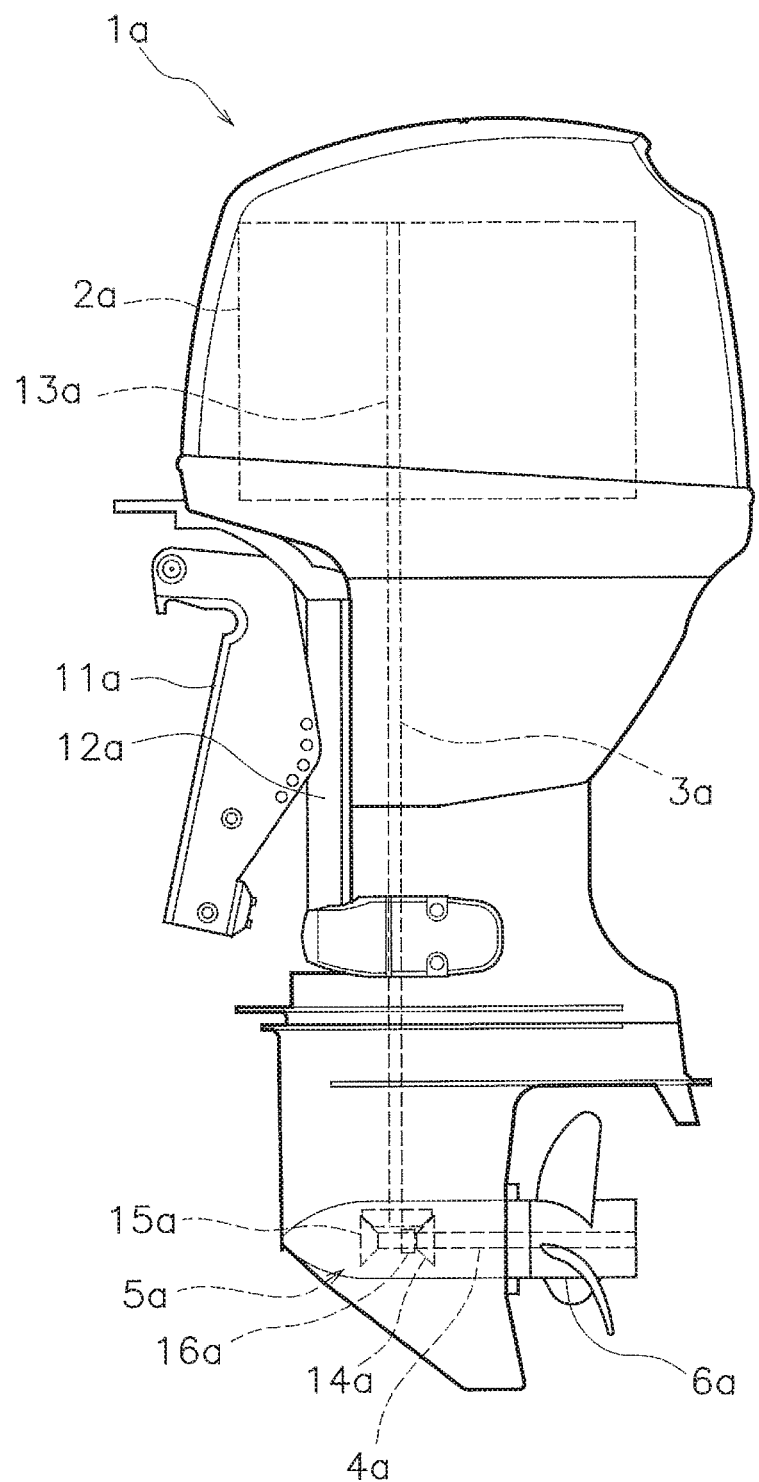
FIG. 2 is a side view of an outboard motor according to a preferred embodiment of the present invention.

FIG. 2 is a side view of the left outboard motor 1a. A structure of the left outboard motor 1a will be hereinafter explained. However, the right outboard motor 1b also preferably has the same or a similar structure to the left outboard motor 1a. The left outboard motor 1a is preferably attached to the watercraft 100 through a bracket 11a. The bracket 11a supports the left outboard motor 1a such that the left outboard motor 1a is rotatable about a steering shaft 12a. The steering shaft 12a extends in the vertical direction.

The left outboard motor 1a preferably includes an engine 2a, a drive shaft 3a, a propeller shaft 4a, and a shift mechanism 5a. The engine 2a generates a thrust to propel the watercraft 100. The engine 2a includes a crankshaft 13a. The crankshaft 13a extends in the vertical direction. The drive shaft 3a is connected to the crankshaft 13a. The drive shaft 3a extends in the vertical direction. The propeller shaft 4a extends in the front-and-back direction. The propeller shaft 4a is connected to the drive shaft 3a through the shift mechanism 5a. A propeller 6a is attached to the propeller shaft 4a.

The shift mechanism 5a preferably includes a forward moving gear 14a, a rearward moving gear 15a, and a clutch 16a. When gear engagement is switched between the gears 14a and 15a by the clutch 16a, the direction of rotation transmitted from the drive shaft 3a to the propeller shaft 4a is reversed. Movement of the watercraft 100 is thus switched between forward movement and rearward movement.

Figure 3:
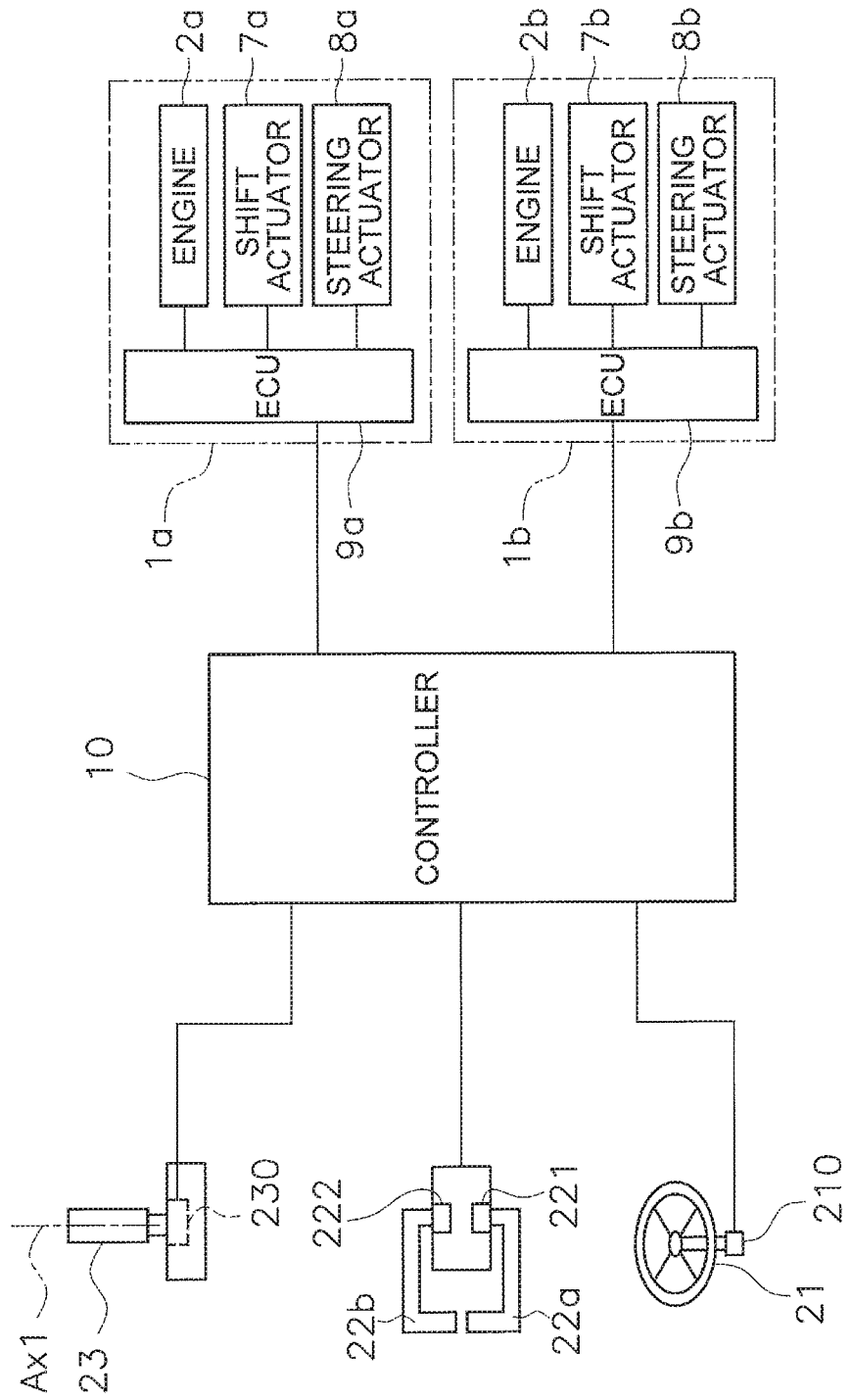
FIG. 3 is a schematic configuration diagram of the watercraft control system.

FIG. 3 is a schematic configuration diagram of a control system of the watercraft 100. As shown in FIG. 3, the left outboard motor 1a preferably includes a shift actuator 7a and a steering actuator 8a.

The shift actuator 7a is connected to the clutch 16a of the shift mechanism 5a. The shift actuator 7a actuates the clutch 16a so as to switch gear engagement between the gears 14a and 15a. Movement of the watercraft 100 is thus switched between forward movement and rearward movement. The shift actuator 7a is preferably an electric motor. It should be noted that the shift actuator 7a may alternatively be another type of actuator such as, for example, an electric cylinder, a hydraulic motor, a hydraulic cylinder, etc.

The steering actuator 8a is connected to the left outboard motor 1a. The steering actuator 8a rotates the left outboard motor 1a about the steering shaft 12a. The rudder angle of the left outboard motor 1a is thus changed. The steering actuator 8a is preferably an electric motor. It should be noted that the shift actuator 7a may alternatively be another type of actuator such as, for example, an electric cylinder, a hydraulic motor, a hydraulic cylinder, etc.

The left outboard motor 1a includes an ECU (electric control unit) 9a. The ECU 9a preferably includes a processor such as a CPU and memory such as, for example, a RAM and a ROM. The ECU 9a stores a program and data used to control the left outboard motor 1a. The ECU 9a controls actions of the engine 2a, the shift actuator 7a, and the steering actuator 8a.

As shown in FIG. 3, the right outboard motor 1b preferably includes an engine 2b, a shift actuator 7b, a steering actuator 8b, and an ECU 9b. The engine 2b, the shift actuator 7b, the steering actuator 8b, and the ECU 9b in the right outboard motor 1b are preferably configured similarly to the engine 2a, the shift actuator 7a, the steering actuator 8a, and the ECU 9a in the left outboard motor 1a, respectively.

The control system includes a steering wheel 21, throttle levers 22a and 22b, and a joystick 23. As shown in FIG. 1, the steering wheel 21, the throttle levers 22a and 22b, and the joystick 23 are disposed in a cockpit 20 of the watercraft 100.

The steering wheel 21 is a device that allows an operator to operate the turning direction of the watercraft 100. The steering wheel 21 includes a sensor 210. The sensor 210 outputs a signal indicating the operating direction and the operating amount of the steering wheel 21.

The throttle levers 22a and 22b are preferably defined by a first lever 22a and a second lever 22b. The first lever 22a is a device that allows the operator to regulate the magnitude of a thrust generated by the left outboard motor 1a. Additionally, the first lever 22a is a device that allows the operator to switch the direction of the thrust generated by the left outboard motor 1a between forward and rearward directions. The first lever 22a is operable from a neutral position to a forwardly moving directional side and a rearward moving directional side. The first lever 22a includes a sensor 221. The sensor 221 outputs a signal indicating the operating direction and the operating amount of the first lever 22a.

The second lever 22b is a device that allows the operator to regulate the magnitude of a thrust generated by the right outboard motor 1b. Additionally, the second lever 22b is a device that allows the operator to switch the direction of the thrust generated by the right outboard motor 1b between forward and rearward directions. The second lever 22b is disposed to be operable from a neutral position to a forwardly moving directional side and a rearward moving directional side. The second lever 22b includes a sensor 222. The sensor 222 outputs a signal indicating the operating direction and the operating amount of the second lever 22b.

The joystick 23 is a device that allows the operator to operate the movement of the watercraft 100 in each of the moving directions of front, rear, right and left. Additionally, the joystick 23 is a device that allows the operator to operate the bow turning motion of the watercraft 100. The joystick 23 is disposed to be tiltable at least in four directions of front, rear, right and left. It should be noted that four or more directions, and furthermore, all directions may be instructed by the joystick 23.

Moreover, the joystick 23 is turnable about a rotational axis Axl. The joystick 23 includes a sensor 230. The sensor 230 outputs a propulsion signal indicating the tilt direction and the tilt amount of the joystick 23. Additionally, the sensor 230 outputs a bow turning signal indicating the twist direction and the twist amount of the joystick 23.

The control system includes a controller 10. The controller 10 preferably includes a processor such as a CPU and memory such as a RAM and a ROM, for example. The controller 10 stores a program and data used to control the right and left outboard motors 1b and 1a. The controller 10 is connected to the ECUs 9a and 9b through wired or wireless communication. The controller 10 is connected to the steering wheel 21, the throttle levers 22a and 22b, and the joystick 23 through wired or wireless communication.

The controller 10 receives signals from the sensors 210, 221, 222, and 230. The controller 10 outputs command signals to the ECUs 9a and 9b based on the signals from the sensors 210, 221, 222 and 230.

For example, the controller 10 outputs a command signal to the shift actuator 7a in accordance with the operating direction of the first lever 22a. Movement of the left outboard motor 1a is thus switched between forward movement and rearward movement. The controller 10 outputs a command signal to the engine 2a in accordance with the operating amount of the first lever 22a. The engine rotational speed of the left outboard motor 1a is thus controlled.

The controller 10 outputs a command signal to the shift actuator 7b in accordance with the operating direction of the second lever 22b. Movement of the right outboard motor 1b is thus switched between forward movement and rearward movement. The controller 10 outputs a command signal to the engine 2b in accordance with the operating amount of the second lever 22b. The engine rotational speed of the right outboard motor 1b is thus controlled.

The controller 10 outputs command signals to the steering actuators 8a and 8b in accordance with the operating direction and the operating amount of the steering wheel 21. When the steering wheel 21 is operated leftward from the neutral position, the controller 10 controls the steering actuators 8b and 8a such that the right and left outboard motors 1b and 1a are rotated rightward. The watercraft 100 thus turns leftward. When the steering wheel 21 is operated rightward from the neutral position, the controller 10 controls the steering actuators 8b and 8a such that the right and left outboard motors 1b and 1a are rotated leftward. The watercraft 100 thus turns rightward. Additionally, the controller 10 controls the rudder angles of the right and left outboard motors 1b and 1a in accordance with the operating amount of the steering wheel 21.

The controller 10 outputs command signals to the engines 2a and 2b, the shift actuators 7a and 7b, and the steering actuators 8a and 8b in accordance with the tilt direction and the tilt amount of the joystick 23. The controller 10 controls the engines 2a and 2b, the shift actuators 7a and 7b, and the steering actuators 8a and 8b such that translation (linear motion) of the watercraft 100 is made at a velocity corresponding to the tilt amount of the joystick 23 in a direction corresponding to the tilt direction of the joystick 23. Additionally, the controller 10 controls the engines 2a and 2b, the shift actuators 7a and 7b, and the steering actuators 8a and 8b such that the watercraft 100 turns the bow at a velocity corresponding to the twist amount of the joystick 23 in a direction corresponding to the twist direction of the joystick 23.

Processing executed by the controller 10 in accordance with an operation of the joystick 23 will be hereinafter explained in detail. In the following explanation, the term "composite operation" refers to a condition that a bow turning operation and a forward (or rearward) moving operation are both ongoing for the watercraft 100. In other words, the term "composite operation" means that the twist operation about the rotational axis Axl and the tilt operation are both ongoing for the joystick 23. On the other hand, the term "sole operation" refers to a condition that only one of the bow turning operation and the forward (or rearward) moving operation is ongoing for the watercraft 100. In other words, the term "sole operation" means that only one of the twist operation about the rotational axis Axl and the tilt operation is ongoing for the joystick 23.

The controller 10 determines which of the composite operation and the sole operation is ongoing based on the signal from the joystick 23. The controller 10 determines that the composite operation of bow turning and propulsion is ongoing when receiving both the propulsion signal indicating the tilt operation of the joystick 23 and the bow turning signal indicating the twist operation of the joystick 23. The controller 10 determines that the sole operation of bow turning is ongoing when receiving the bow turning signal without receiving the propulsion signal. The controller 10 determines that the sole operation of propulsion is ongoing when receiving the propulsion signal without receiving the bow turning signal.

Figure 4:
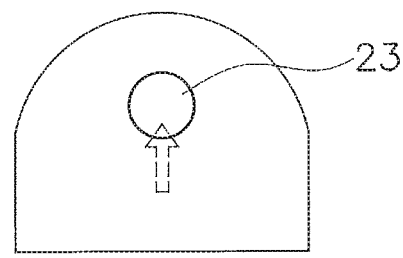
FIG. 4 is a schematic diagram showing control of the outboard motors in a sole operation of forward movement.
Figure 4:
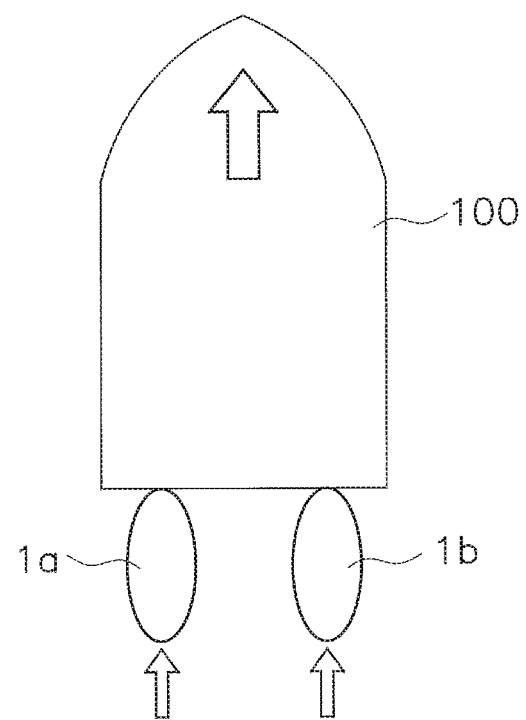

FIG. 4 is a schematic diagram showing control of the outboard motors 1a and 1b in the sole operation of propulsion. In FIG. 4, the joystick 23 is tilted in the forward moving direction. In other words, FIG. 4 shows control of the outboard motors 1a and 1b in the sole operation of forward movement. In this case, the controller 10 controls each of the right and left outboard motors 1b and 1a to generate a thrust in the forward moving direction. The watercraft 100 thus moves forward.

In the sole operation of propulsion, the thrusts generated by the right and left outboard motors 1b and 1a are the same in direction and magnitude. The controller 10 causes each of the right and left outboard motors 1b and 1a to generate a thrust in accordance with the tilt amount of the joystick 23. The rudder angles of the right and left outboard motors 1b and 1a are both 0 degrees. It should be noted that each of the rudder angles of the right and left outboard motors 1b and 1a may be set such that each of the right and left outboard motors 1b and 1a turns to a toe-in or toe-out side from a 0-degree orientation thereof. It should be noted that a rudder angle of 0 degrees means a condition of each of the outboard motors 1a and 1b oriented in parallel with the fore direction of the watercraft 100.

Figure 5:
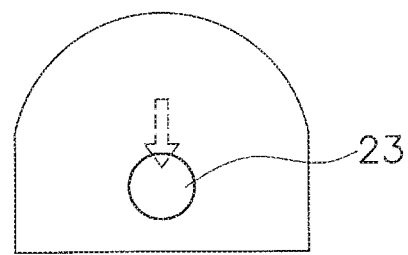
FIG. 5 is a schematic diagram showing control of the outboard motors in a sole operation of rearward movement.
Figure 5:
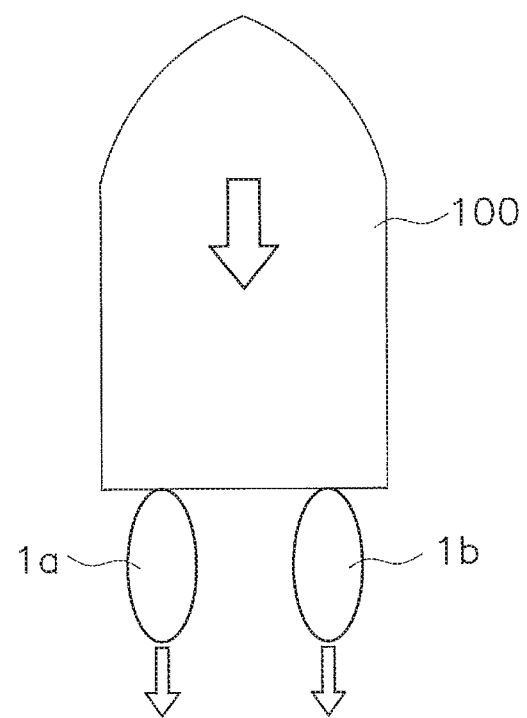

When the joystick 23 is tilted in the rearward moving direction, the controller 10 controls each of the right and left outboard motors 1b and 1a to generate a thrust in the rearward moving direction as shown in FIG. 5. The watercraft 100 thus moves rearward.

Figure 6:
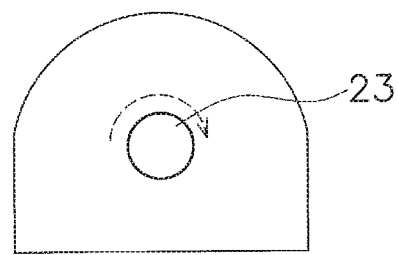
FIG. 6 is a diagram showing control of the outboard motors in a sole operation of rightward bow turning.
Figure 6:
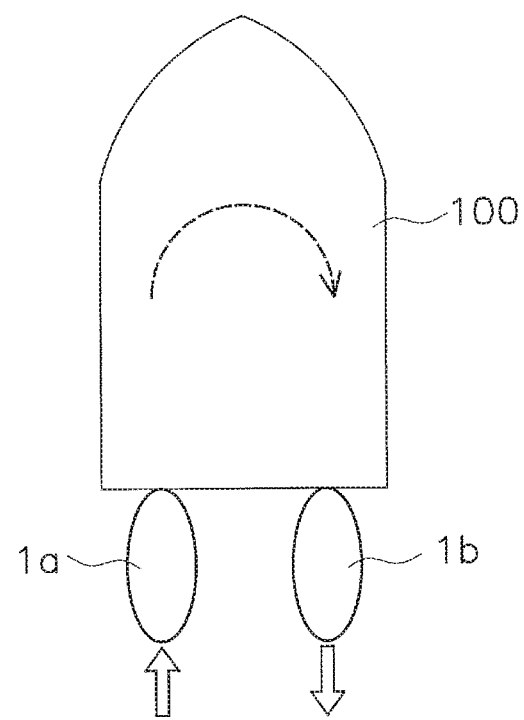

FIG. 6 is a diagram showing control of the outboard motors in the sole operation of bow turning. In the sole operation of bow turning, the controller 10 causes one of the right and left outboard motors 1b and 1a to generate a thrust in the forward moving direction and causes the other of the right and left outboard motors 1b and 1a to generate a thrust in the rearward moving direction in accordance with the bow turning direction indicated by the bow turning signal.

Specifically, the joystick 23 is twisted rightward in FIG. 6. In other words, FIG. 6 shows control of the outboard motors in the sole operation of rightward bow turning. In this case, the controller 10 causes the left outboard motor 1a to generate a forward thrust, and simultaneously, causes the right outboard motor 1b to generate a rearward thrust. The watercraft 100 thus turns the bow rightward.

In the sole operation of bow turning, the thrusts generated by the right and left outboard motors 1b and 1a are preferably the same in magnitude but are opposite in direction. The controller 10 causes each of the right and left outboard motors 1b and 1a to generate a thrust in accordance with the twist amount of the joystick 23. The rudder angles of the right and left outboard motors 1b and 1a are both 0 degrees. It should be noted that each of the rudder angles of the right and left outboard motors 1b and 1a may be set such that each of the right and left outboard motors 1b and 1a turns to a toe-in or toe-out side from the 0-degree orientation thereof.

Figure 7:
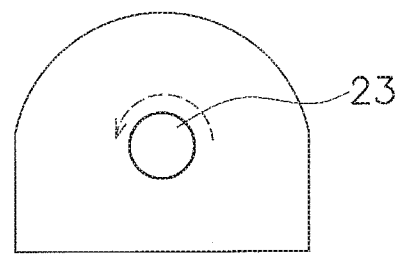
FIG. 7 is a diagram showing control of the outboard motors in a sole operation of leftward bow turning.
Figure 7:
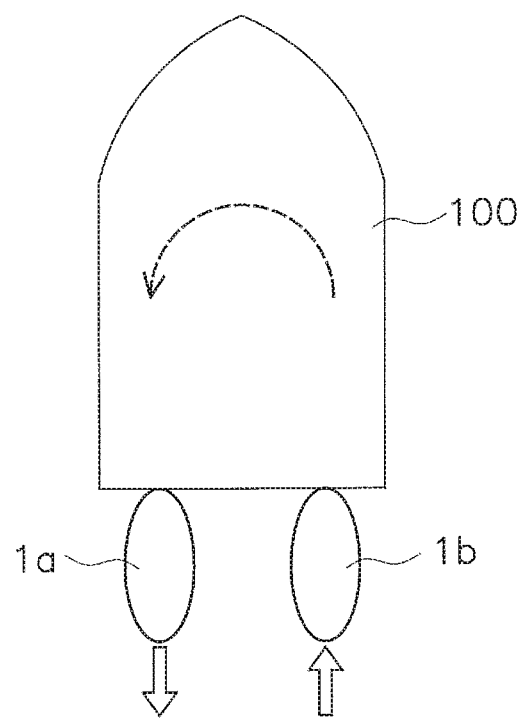

When the joystick 23 is twisted leftward, as shown in FIG. 7, the controller 10 causes the right outboard motor 1b to generate a forward thrust, and simultaneously, causes the left outboard motor 1a to generate a rearward thrust. The watercraft 100 thus turns the bow leftward.

Next, control of the outboard motors 1a and 1b in the composite operation will be explained. In starting the composite operation, the controller 10 causes one of the right and left outboard motors 1b and 1a to generate a thrust in a propulsion direction indicated by the propulsion signal, and simultaneously causes the other of the right and left outboard motors 1b and 1a to generate a thrust directed oppositely to the propulsion direction. Here, one of the right and left outboard motors 1b and 1a, which generates the thrust in the propulsion direction indicated by the propulsion signal, is defined as a first outboard motor, whereas the other of the right and left outboard motors 1b and 1a, which generates the thrust directed oppositely to the propulsion direction, is defined as a second outboard motor.

In the composite operation, when the magnitude of a command value indicated by the propulsion signal falls within a first range, the controller 10 controls the first outboard motor to increase the thrust in the propulsion direction, and simultaneously, controls the second outboard motor to reduce the thrust directed oppositely to the propulsion direction. The magnitude of the command value indicated by the propulsion signal corresponds to the tilt amount of the joystick 23. Therefore, when the tilt amount of the joystick 23 falls within the first range, the controller 10 controls the first outboard motor to increase the thrust in the propulsion direction, and simultaneously controls the second outboard motor to reduce the thrust directed oppositely to the propulsion direction.

In the composite operation, when the tilt amount falls within a second range greater than the first range, the controller 10 controls the first outboard motor to make the thrust in the propulsion direction greater than that when the tilt amount falls within the first range, and simultaneously, maintains the second outboard motor in a neutral state.

In the composite operation, when the tilt amount falls within a third range greater than the second range, the controller 10 controls the first outboard motor to make the thrust in the propulsion direction greater than that when the tilt amount falls within the second range, and simultaneously controls the second outboard motor to generate a thrust in the propulsion direction.

It should be noted that in the composite operation, the controller 10 maintains each of the rudder angles of the first and second outboard motors constant as long as the tilt amount of the joystick 23 falls within any of the first, second, and third ranges. For example, the controller 10 maintains each of the rudder angles of the first and second outboard motors at 0 degrees. Alternatively, the controller 10 may maintain each of the rudder angles of the first and second outboard motors at a predetermined angle such that each of the first and second outboard motors turns to the toe-in or toe-out side.

Figure 8:
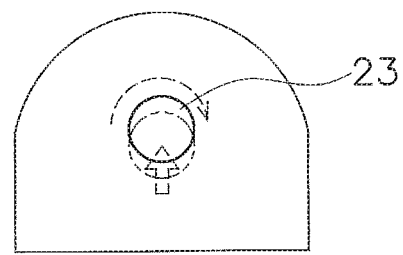
FIG. 8 is a diagram showing control of the outboard motors in a first composite operation.
Figure 8:
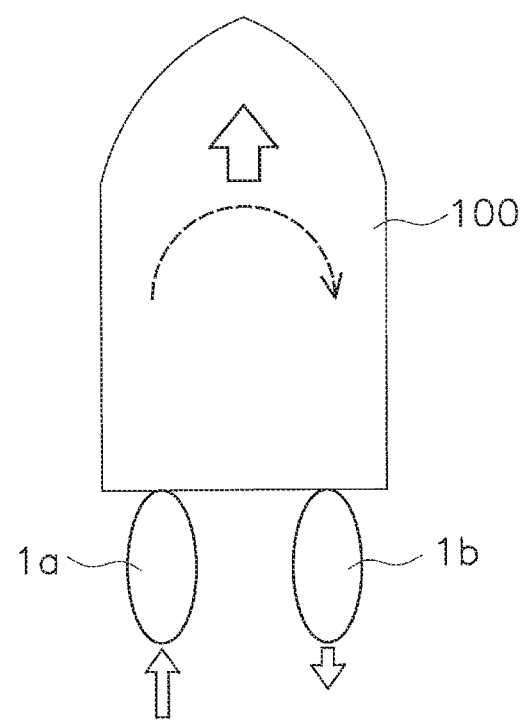
Figure 9:
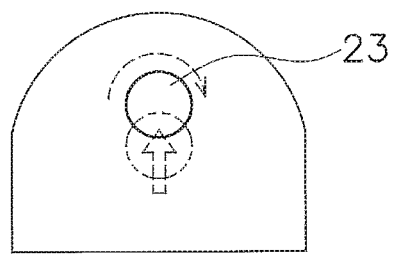
FIG. 9 is a diagram showing control of the outboard motors in the first composite operation.
Figure 9:
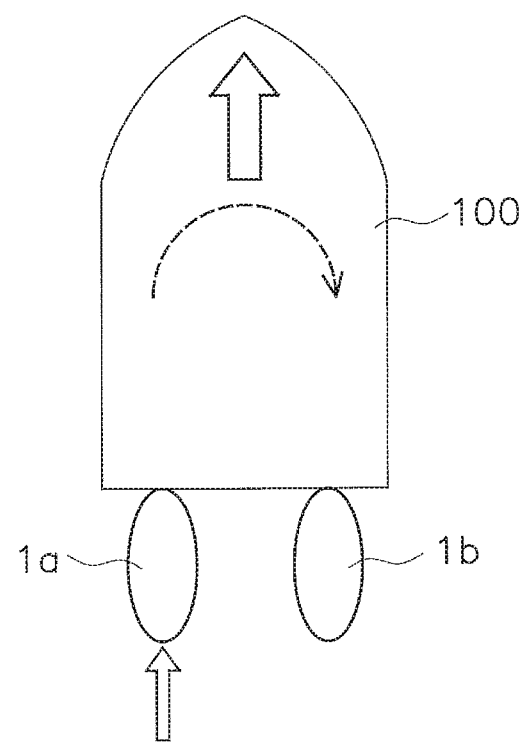
Figure 10:
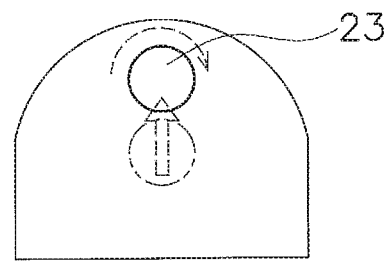
FIG. 10 is a diagram showing control of the outboard motors in the first composite operation.
Figure 10:
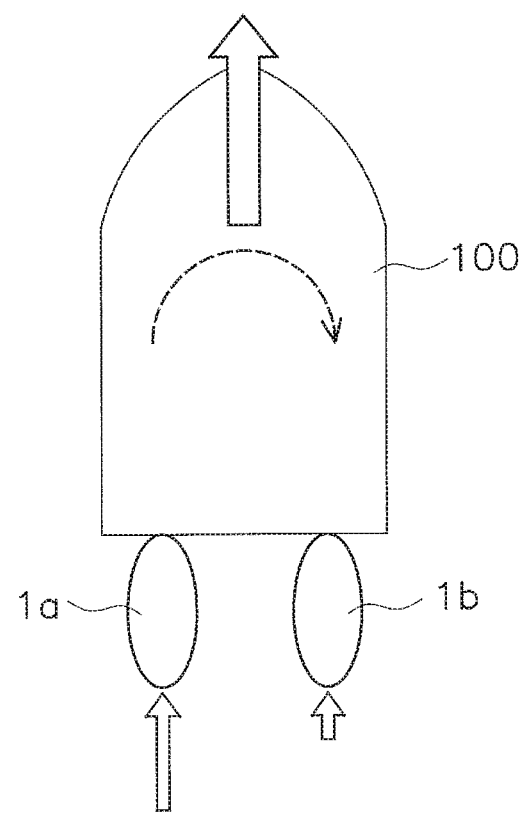

FIGS. 8 to 10 are diagrams showing control of the outboard motors 1a and 1b in a first composite operation. The first composite operation means that the bow turning direction indicated by the bow turning signal is rightward while the propulsion direction indicated by the propulsion signal is forward. In other words, the first composite operation means that the rightward twist operation and the forward tilt operation are both ongoing for the joystick 23.

FIG. 8 shows control of the outboard motors 1a and 1b when the tilt amount of the joystick 23 falls within the first range in the first composite operation. In starting the first composite operation, the controller 10 causes the left outboard motor 1a to generate a thrust in the propulsion direction indicated by the propulsion signal (i.e., a forward thrust), and simultaneously causes the right outboard motor 1b to generate a thrust in the opposite direction to the propulsion direction (i.e., a rearward thrust). Therefore, in the first composite operation, the left outboard motor 1a corresponds to the first outboard motor, whereas the right outboard motor 1b corresponds to the second outboard motor.

In the first composite operation, when the tilt amount of the joystick 23 falls within the first range, the controller 10 causes the left outboard motor 1a to increase the forward thrust, and simultaneously causes the right outboard motor 1b to reduce the rearward thrust in accordance with the tilt amount of the joystick 23. Accordingly, the forward thrust generated by the left outboard motor 1a becomes greater than the rearward thrust generated by the right outboard motor 1b. Therefore, when the operator tilts the joystick 23 forward while twisting the joystick 23 rightward, the watercraft 100 starts moving forward while turning the bow rightward.

FIG. 9 shows control of the outboard motors 1a and 1b when the tilt amount of the joystick 23 falls within the second range in the first composite operation. In the first composite operation, when the tilt amount of the joystick 23 falls within the second range, the controller 10 causes the left outboard motor 1a to further increase the forward thrust in accordance with the tilt amount of the joystick 23, and simultaneously maintains the right outboard motor 1b in a neutral state. Therefore, when the operator further tilts the joystick 23 forward while twisting the joystick 23 rightward, the watercraft 100 increases the velocity in forward movement while turning the bow rightward.

FIG. 10 shows control of the outboard motors 1a and 1b when the tilt amount of the joystick 23 falls within the third range in the first composite operation. In the first composite operation, when the tilt amount of the joystick 23 falls within the third range, the controller 10 causes the left outboard motor 1a to further increase the forward thrust, and simultaneously causes the right outboard motor 1b to generate a forward thrust. Additionally, the controller 10 causes each of the right and left outboard motors 1b and 1a to increase the forward thrust in accordance with the tilt amount of the joystick 23. Therefore, when the operator further tilts the joystick 23 forward while twisting the joystick 23 rightward, the watercraft 100 further increases the velocity in forward movement while turning the bow rightward.

Figure 11:
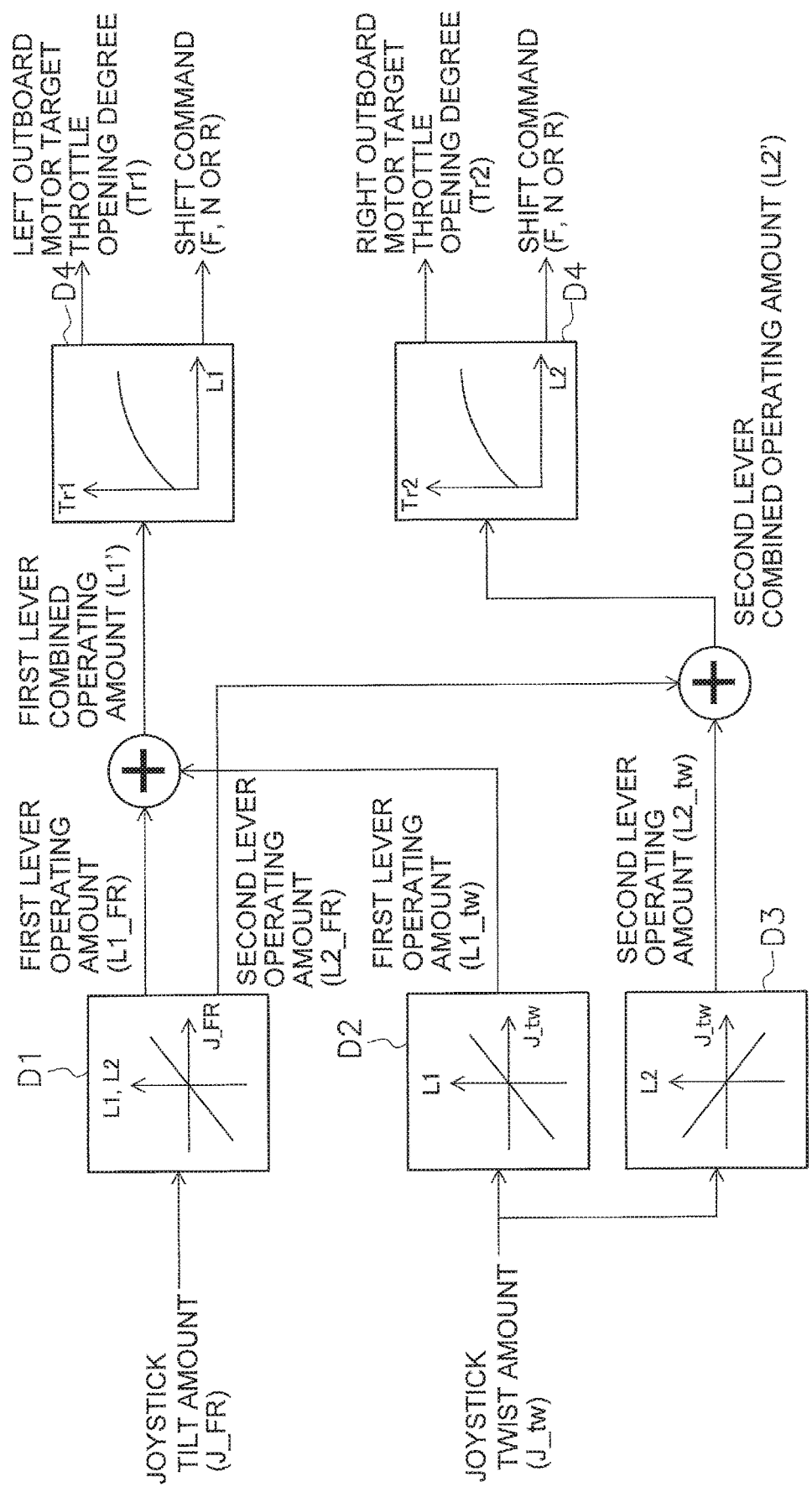
FIG. 11 is a diagram showing processing for determining command values given to engines and shift actuators in operating a joystick.

FIG. 11 is a diagram showing processing that determines command values given to the engines 2a and 2b and the shift actuators 7a and 7b in operating the joystick 23. As shown in FIG. 11, the controller 10 stores data D1 used to convert a tilt amount J_FR of the joystick 23 into an operating amount L1 of the first lever 22a and an operating amount L2 of the second lever 22b. The controller 10 calculates an operating amount L1_FR by converting the tilt amount J_FR of the joystick 23 into the operating amount of the first lever 22a with reference to the data D1. Additionally, the controller 10 calculates an operating amount L2_FR by converting the tilt amount J_FR of the joystick 23 into the operating amount of the second lever 22b with reference to the data D1.

The controller 10 stores data D2 used to convert a twist amount J_tw of the joystick 23 into the operating amount L1 of the first lever 22a. The controller 10 calculates an operating amount L1_tw by converting the twist amount J_tw of the joystick 23 into the operating amount of the first lever 22a with reference to the data D2.

Additionally, the controller 10 stores data D3 used to convert the twist amount J_tw of the joystick 23 into the operating amount L2 of the second lever 22b. The controller 10 calculates an operating amount L2_tw by converting the twist amount J_tw of the joystick 23 into the operating amount of the second lever 22b with reference to the data D3.

In the composite operation, the controller 10 calculates a combined operating amount L1' of the first lever 22a based on the operating amount L1_FR obtained by conversion and the operating amount L1_tw obtained by conversion. For example, the controller 10 calculates the combined operating amount L1' of the first lever 22a in the composite operation by adding the operating amount L1_tw obtained by conversion to the operating amount L1_FR contained by conversion. The controller 10 calculates a combined operating amount L2' of the second lever 22b in the composite operation based on the operating amount L2_FR obtained by conversion and the operating amount L2_tw obtained by conversion. For example, the controller 10 calculates the combined operating amount L2' of the second lever 22b in the composite operation by adding the operating amount L2_tw obtained by conversion to the operating amount L2_FR obtained by conversion.

It should be noted that the methods of calculating the combined operating amounts L1' and L2' are not limited to the above, and may be changed. For example, each of the operating amounts L1_FR and L1_tw obtained by conversion may be multiplied by a predetermined coefficient. Each of the operating amounts L2_FR and L2_tw obtained by conversion may be multiplied by a predetermined coefficient.

The controller 10 stores data D4 defining a relationship between the operating amount L1 of the first lever 22a and a target throttle opening degree Tr1 of the engine 2a and a relationship between the operating amount L2 of the second lever 22b and a target throttle opening degree Tr2 of the engine 2b. The controller 10 determines the target throttle opening degree Tr1 of the engine 2a based on the combined operating amount L1' with reference to the data D4. The controller 10 determines the target throttle opening degree Tr2 of the engine 2b based on the combined operating amount L2' with reference to the data D4. It should be noted that the data D1 to D4 may be provided in a table, for example, or may alternatively be made in another form such as a mathematical formula or so forth.

Additionally, the controller 10 determines a command given to the shift actuator 7a of the left outboard motor 1a based on the combined operating amount L1'. The controller 10 determines a command given to the shift actuator 7b of the right outboard motor 1b based on the combined operating amount L2'. The controller 10 determines one of commands F (forward movement), N (neutral state), and R (rearward movement) as the command given to each of the shift actuators 7a and 7b in accordance with each of the combined operating amounts L1' and L2'. For example, the controller 10 determines one of the commands F (forward movement), N (neutral state), and R (rearward movement) as the command given to each of the shift actuators 7a and 7b in accordance with the range of a voltage value of a signal indicating each of the combined operating amounts L1' and L2'.

It should be noted that in operating the first lever 22a, the controller 10 determines the target throttle opening degree Tr1 of the engine 2a and the command given to the shift actuator 7a based on the operating amount L1 of the first lever 22a indicated by the signal from the sensor 221 with reference to the data D4. In operating the second lever 22b, the controller 10 determines the target throttle opening degree Tr2 of the engine 2b and the command given to the shift actuator 7b based on the operating amount L2 of the second lever 22b indicated by the signal from the sensor 222 with reference to the data D4.

The controller 10 controls the engine 2a of the left outboard motor 1a based on the target throttle opening degree Tr1. The controller 10 controls the engine 2b of the right outboard motor 1b based on the target throttle opening degree Tr2. The controller 10 controls the shift actuator 7a of the left outboard motor 1a based on the command given to the shift actuator 7a. The controller 10 controls the shift actuator 7b of the right outboard motor 1b based on the command given to the shift actuator 7b.

It should be noted that in the sole operation of propulsion, the operating amounts L1_tw and L2_tw, obtained by converting the twist amount J_tw of the joystick 23, are both "0". Therefore, the controller 10 determines the target throttle opening degrees Tr1 and Tr2 based on the operating amounts L1_FR and L2_FR, obtained by converting the tilt amount J_FR of the joystick 23, with reference to the data D4. In the sole operation of propulsion, the target throttle opening degrees Tr1 and Tr2 become the same. Moreover, in the sole operation of propulsion, the commands given to the shift actuators 7a and 7b become the same.

In the sole operation of bow turning, the operating amounts L1_FR and L2_FR, obtained by converting the tilt amount J_FR of the joystick 23, are both "0". Therefore, the controller 10 determines the target throttle opening degrees Tr1 and Tr2 based on the operating amounts L1_tw and L2_tw obtained by converting the twist amount J_tw of the joystick 23 with reference to the data D4. In the sole operation of bow turning, the target throttle opening degrees Tr1 and Tr2 become the same. Additionally, in the sole operation of bow turning, directions indicated by the commands given to the shift actuators 7a and 7b become opposite to each other.

Figure 12:
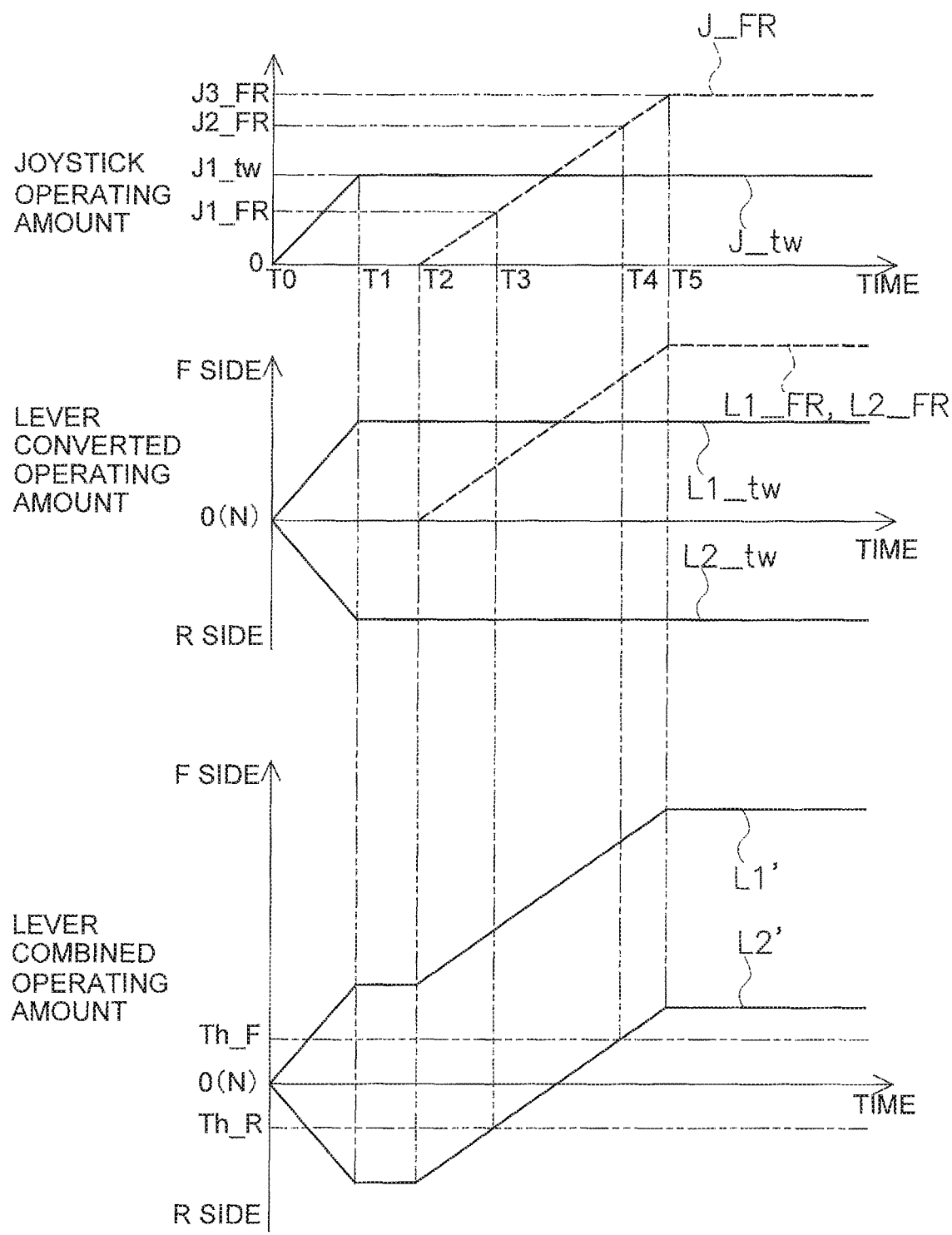
FIG. 12 is a timing chart showing an example of change in operating amounts of the joystick, operating amounts obtained by conversion, and combined operating amounts in the first composite operation.

FIG. 12 is a timing chart showing an example of change in operating amounts of the joystick 23, operating amounts of the first and second levers 22a and 22b obtained by conversion, and combined operating amounts of the first and second levers 22a and 22b in the first composite operation according to a preferred embodiment of the present invention. As shown in FIG. 12, from point of time T0 to point of time T2, the twist operation of the joystick 23 is ongoing (J_tw>0), but the tilt operation thereof is not ongoing (J_FR=0). Therefore, from point of time T0 to point of time T2, the sole operation of bow turning is ongoing. The joystick 23 is herein twisted rightward.

From point of time T0 to point of time T1, the twist amount J_tw increases. In accordance, the operating amount L1_tw of the first lever 22a, obtained by converting the twist amount J_tw, increases in the forward moving direction. On the other hand, the operating amount L2_tw of the second lever 22b, obtained by converting the twist amount J_tw, increases in the rearward moving direction.

From point of time T1 to point of time T2, the twist amount J_tw is constant at j1_tw. Therefore, the operating amount L1_tw of the first lever 22a, obtained by conversion, is constant at a value corresponding to j1_tw, and likewise, the operating amount L2_tw of the second lever 22b, obtained by conversion, is constant at another value corresponding to j1_tw.

From point of time T0 to point of time T2, the combined operating amount L1' is the same as the operating amount L1_tw of the first lever 22a obtained by converting the twist amount J_tw, whereas the combined operating amount L2' is the same as the operating amount L2_tw of the second lever 22b obtained by converting the twist amount J_tw. Therefore, from point of time T0 to point of time T2, as shown in FIG. 6, the left outboard motor 1a generates a thrust for forward movement, whereas the right outboard motor 1b generates a thrust for rearward movement. The thrust generated by the left outboard motor 1a and that generated by the right outboard motor 1b are different in direction but are the same in magnitude.

At and after point of time T2, the composite operation of bow turning and propulsion is ongoing. The tilt amount J_FR of the joystick 23 increases from point of time T2 to point of time T5, and becomes constant at j3_FR at and after point of time T5. It should be noted that the joystick 23 is being tilted in the forward moving direction. From point of time T2 to point of time T5, the operating amount L1_FR of the first lever 22a and the operating amount L2_FR of the second lever 22b, both of which are obtained by converting the tilt amount J_FR, increase in the forward moving direction in accordance with the tilt amount J_FR of the joystick 23. Additionally, at and after point of time T5, the operating amount L1_FR of the first lever 22a and the operating amount L2_FR of the second lever 22b, both of which are obtained by converting the tilt amount J_FR, are constant at a value corresponding to j3_FR.

In the composite operation at and after point of time T2, the combined operating amount L1' is a value obtained by combining the operating amount L1_tw of the first lever 22a obtained by converting the twist amount J_tw and the operating amount L1_FR of the first lever 22a obtained by converting the tilt amount J_FR. On the other hand, the combined operating amount L2' is a value obtained by combining the operating amount L2_tw of the second lever 22b obtained by converting the twist amount J_tw and the operating amount L2_FR of the second lever 22b obtained by converting the tilt amount J_FR.

The combined operating amount L1' increases in the forward moving direction from point of time T2 to point of time T5, and then becomes constant at and after point of time T5. The combined operating amount L2' reduces in the rearward moving direction from point of time T2 to point of time T3. Therefore, from point of time T2 to point of time T3, as shown in FIG. 8, the left outboard motor 1a increases the thrust for forward movement, whereas the right outboard motor 1b reduces the thrust for rearward movement. It should be noted that from point of time T2 to point of time T3, the tilt amount J_FR of the joystick 23 falls within the first range from 0 to j1_FR in the forward moving direction.

At and after point of time T3, when the combined operating amount L2' becomes less than a threshold Th_R in the rearward moving direction, the command given to the shift actuator 7b is switched from the command R (rearward movement) to the command N (neutral state). In a period from point of time T3 to point of time T4, the combined operating amount L2' becomes "0", and then, increases in the forward moving direction. In the period from point of time T3 to point of time T4, until the combined operating amount L2' reaches a threshold Th_F, the command N (neutral state) is kept given to the shift actuator 7b. Therefore, in the period from point of time T3 to point of time T4, as shown in FIG. 9, the left outboard motor 1a increases the thrust in the forward moving direction, whereas the right outboard motor 1b is maintained in the neutral state. It should be noted that in the period from point of time T3 to point of time T4, the tilt amount J_FR of the joystick 23 falls within the second range from j1_FR to j2_FR in the forward moving direction.

At and after point of time T4, when the combined operating amount L2' becomes greater than the threshold Th_F in the forward moving direction, the command given to the shift actuator 7b is switched from the command N (neutral state) to the command F (forward movement). The combined operating amount L2' increases in the forward moving direction from point of time T4 to point of time T5, and then, becomes constant at and after point of time T5. Therefore, at and after point of time T4, as shown in FIG. 10, the left outboard motor 1a increases the thrust in the forward moving direction, and likewise, the right outboard motor 1b increases the thrust in the forward moving direction. It should be noted that at and after point of time T4, the tilt amount J_FR of the joystick 23 falls within the third range from j2_FR to j3_FR in the forward moving direction.

The control in the first composite operation has been explained above. However, control in each of second to fourth composite operations is similar to that in the first composite operation except for difference in thrust direction. Control in each of the second to fourth composite operations will be hereinafter explained.

Figure 13:
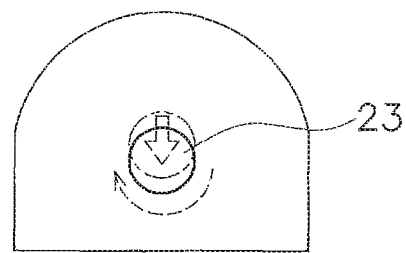
FIG. 13 is a diagram showing control of the outboard motors in a second composite operation.
Figure 13:
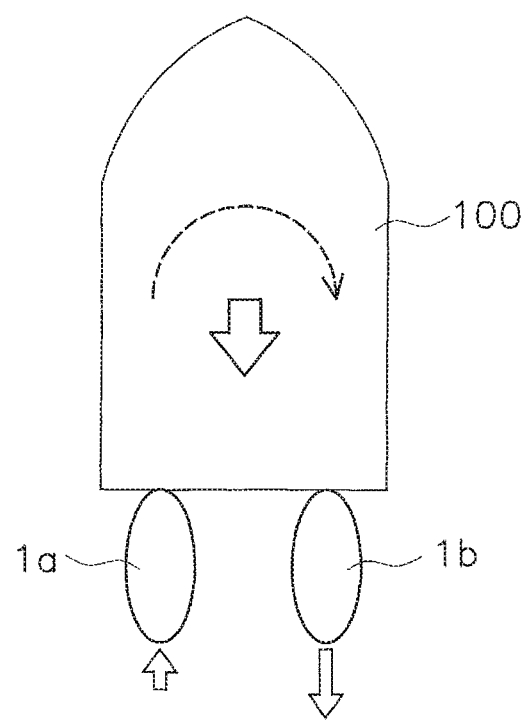

FIG. 13 shows control of the outboard motors 1a and 1b when the tilt amount of the joystick 23 falls within the first range in the second composite operation. The second composite operation means that the bow turning direction indicated by the bow turning signal is rightward, while the propulsion direction indicated by the propulsion signal is rearward. In other words, the second composite operation means that the rightward twist operation and the rearward tilt operation are both ongoing for the joystick 23.

In starting the second composite operation, the controller 10 causes the right outboard motor 1b to generate a thrust in the propulsion direction indicated by the propulsion signal (i.e., a rearward thrust), and simultaneously, causes the left outboard motor 1a to generate a thrust in the opposite direction to the propulsion direction (i.e., a forward thrust). Therefore, in the second composite operation, the right outboard motor 1b corresponds to the first outboard motor, whereas the left outboard motor 1a corresponds to the second outboard motor.

As shown in FIG. 13, in the second composite operation, when the tilt amount of the joystick 23 falls within the first range, the controller 10 causes the right outboard motor 1b to increase the rearward thrust, and simultaneously, causes the left outboard motor 1a to reduce the forward thrust, in accordance with the tilt amount of the joystick 23. Accordingly, the rearward thrust generated by the right outboard motor 1b becomes greater than the forward thrust generated by the left outboard motor 1a. Therefore, when the operator tilts the joystick 23 rearward while twisting the joystick 23 rightward, the watercraft 100 starts moving rearward while turning the bow rightward.

Although not shown in the drawings, in the second composite operation when the tilt amount of the joystick 23 falls within the second range, the controller 10 causes the right outboard motor 1b to further increase the rearward thrust in accordance with the tilt amount of the joystick 23, and simultaneously, maintains the left outboard motor 1a in the neutral state. Therefore, when the operator further tilts the joystick 23 rearward while twisting the joystick 23 rightward, the watercraft 100 increases the velocity in rearward movement while turning the bow rightward.

In the second composite operation, when the tilt amount of the joystick 23 falls within the third range, the controller 10 causes the right outboard motor 1b to further increase the rearward thrust, and simultaneously causes the left outboard motor 1a to generate a rearward thrust. Additionally, the controller 10 causes each of the right and left outboard motors 1b and 1a to increase the rearward thrust in accordance with the tilt amount of the joystick 23. Therefore, when the operator further tilts the joystick 23 rearward while twisting the joystick 23 rightward, the watercraft 100 further increases the velocity in rearward movement while turning the bow rightward.

Figure 14:
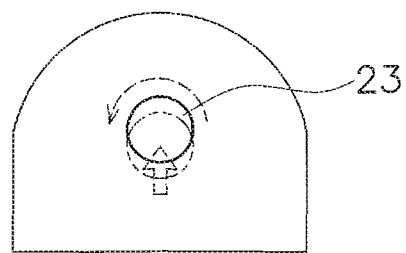
FIG. 14 is a diagram showing control of the outboard motors in a third composite operation.
Figure 14:
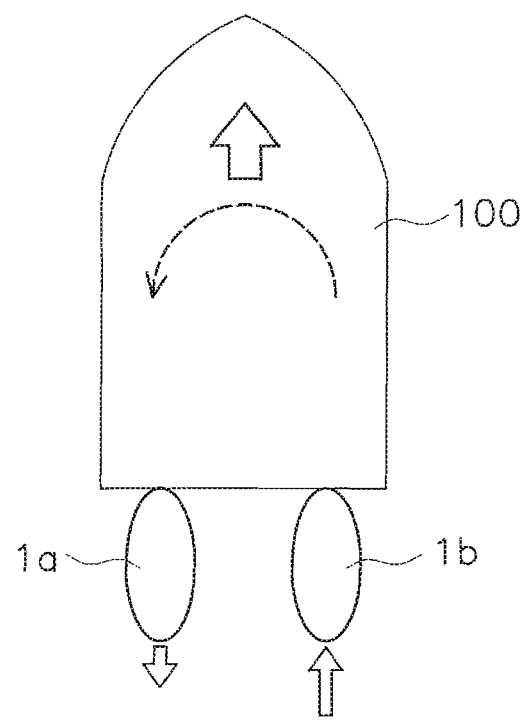

FIG. 14 is a diagram showing control of the outboard motors 1a and 1b when the tilt amount of the joystick 23 falls within the first range in the third composite operation. The third composite operation means that the bow turning direction indicated by the bow turning signal is leftward, while the propulsion direction indicated by the propulsion signal is forward. In other words, the third composite operation means that the leftward twist operation and the forward tilt operation are both ongoing for the joystick 23.

In starting the third composite operation, the controller 10 causes the right outboard motor 1b to generate a thrust in the propulsion direction indicated by the propulsion signal (i.e., a forward thrust), and simultaneously causes the left outboard motor 1a to generate a thrust in the opposite direction to the propulsion direction (i.e., a rearward thrust). Therefore, in the third composite operation, the right outboard motor 1b corresponds to the first outboard motor, whereas the left outboard motor 1a corresponds to the second outboard motor.

As shown in FIG. 14, in the third composite operation, when the tilt amount of the joystick 23 falls within the first range, the controller 10 causes the right outboard motor 1b to increase the forward thrust, and simultaneously causes the left outboard motor 1a to reduce the rearward thrust, in accordance with the tilt amount of the joystick 23. Accordingly, the forward thrust generated by the right outboard motor 1b becomes greater than the rearward thrust generated by the left outboard motor 1a. Therefore, when the operator tilts the joystick 23 forward while twisting the joystick 23 leftward, the watercraft 100 starts moving forward while turning the bow leftward.

Although not shown in the drawings, in the third composite operation, when the tilt amount of the joystick 23 falls within the second range, the controller 10 causes the right outboard motor 1b to further increase the forward thrust in accordance with the tilt amount of the joystick 23, and simultaneously, maintains the left outboard motor 1a in the neutral state. Therefore, when the operator further tilts the joystick 23 forward while twisting the joystick 23 leftward, the watercraft 100 increases the velocity in forward movement while turning the bow leftward.

In the third composite operation, when the tilt amount of the joystick 23 falls within the third range, the controller 10 causes the right outboard motor 1b to further increase the forward thrust, and simultaneously causes the left outboard motor 1a to generate a forward thrust. Additionally, the controller 10 causes each of the right and left outboard motors 1b and 1a to increase the forward thrust in accordance with the tilt amount of the joystick 23. Therefore, when the operator further tilts the joystick 23 forward while twisting the joystick 23 leftward, the watercraft 100 further increases the velocity in forward movement while turning the bow leftward.

Figure 15:
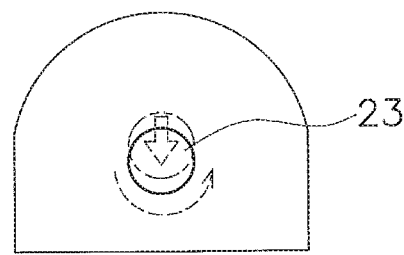
FIG. 15 is a diagram showing control of the outboard motors in a fourth composite operation.
Figure 15:
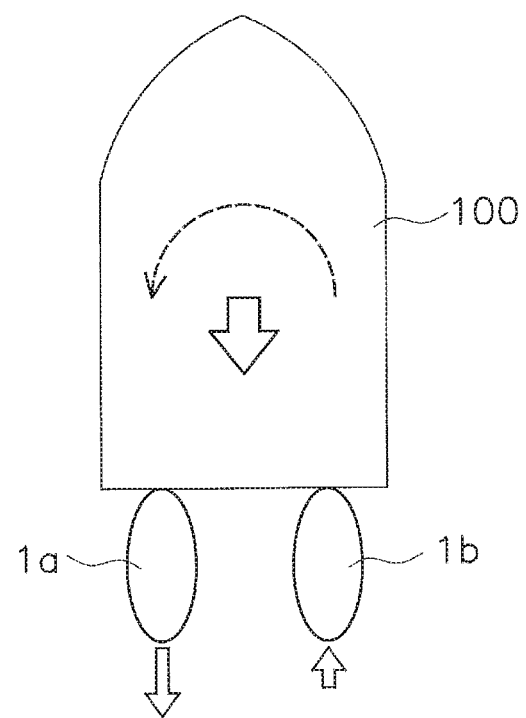

FIG. 15 is a diagram showing control of the outboard motors 1a and 1b when the tilt amount of the joystick 23 falls within the first range in the fourth composite operation. The fourth composite operation means that the bow turning direction indicated by the bow turning signal is leftward, while the propulsion direction indicated by the propulsion signal is rearward. In other words, the fourth composite operation means that the leftward twist operation and the rearward tilt operation are both ongoing for the joystick 23.

In starting the fourth composite operation, the controller 10 causes the left outboard motor 1a to generate a thrust in the propulsion direction indicated by the propulsion signal (i.e., a rearward thrust), and simultaneously causes the right outboard motor 1b to generate a thrust in the opposite direction to the propulsion direction (i.e., a forward thrust). Therefore, in the fourth composite operation, the left outboard motor 1a corresponds to the first outboard motor, whereas the right outboard motor 1b corresponds to the second outboard motor.

As shown in FIG. 15, in the fourth composite operation, when the tilt amount of the joystick 23 falls within the first range, the controller 10 causes the left outboard motor 1a to increase the rearward thrust, and simultaneously causes the right outboard motor 1b to reduce the forward thrust, in accordance with the tilt amount of the joystick 23. Accordingly, the rearward thrust generated by the left outboard motor 1a becomes greater than the forward thrust generated by the right outboard motor 1b. Therefore, when the operator tilts the joystick 23 rearward while twisting the joystick 23 leftward, the watercraft 100 starts moving rearward while turning the bow leftward.

Although not shown in the drawings, in the fourth composite operation when the tilt amount of the joystick 23 falls within the second range, the controller 10 preferably causes the left outboard motor 1a to further increase the rearward thrust in accordance with the tilt amount of the joystick 23, and simultaneously maintains the right outboard motor 1b in the neutral state. Therefore, when the operator further tilts the joystick 23 rearward while twisting the joystick 23 leftward, the watercraft 100 increases the velocity in rearward movement while turning the bow leftward.

In the fourth composite operation, when the tilt amount of the joystick 23 falls within the third range, the controller 10 causes the left outboard motor 1a to further increase the rearward thrust, and simultaneously, causes the right outboard motor 1b to generate a rearward thrust. Additionally, the controller 10 causes each of the right and left outboard motors 1b and 1a to increase the rearward thrust in accordance with the tilt amount of the joystick 23. Therefore, when the operator further tilts the joystick 23 rearward while twisting the joystick 23 leftward, the watercraft 100 further increases the velocity in rearward movement while turning the bow leftward.

In the control system for the watercraft 100 according to the present preferred embodiment explained above, when the joystick 23 is tilted while being twisted, the thrust in the propulsion direction, generated by one of the right and left outboard motors 1b and 1a, increases as the tilt amount of the joystick 23 changes to sequentially fall within the first range, the second range, and then the third range. Additionally, the direction of the thrust generated by the other of the right and left outboard motors 1b and 1a is switched to the propulsion direction from the direction opposite to the propulsion direction via the neutral state as the tilt amount of the joystick 23 changes to sequentially fall within the first range, the second range, and then the third range.

Therefore, the balance in thrust between the right and left outboard motors 1b and 1a continuously changes in accordance with change in tilt amount of the joystick 23. Accordingly, such an operation as adjustment in vessel velocity and direction of the watercraft 100 is able to be easily performed.

Additionally, in the composite operation, the rudder angles of the right and left outboard motors 1b and 1a are maintained constant while the tilt amount of the joystick 23 changes to sequentially fall within the first range, the second range, and then the third range. Therefore, the impact of the delay in changing the rudder angles of the outboard motors 1a and 1b is able to be reduced or prevented in comparison with a situation that the rudder angles of the outboard motors 1a and 1b are changed in the composite operation. Accordingly, bow turning and movement of the watercraft 100 is able to be simultaneously done in a smooth manner.

Preferred embodiments of the present invention have been explained above. However, the present invention is not limited to the aforementioned preferred embodiments, and a variety of changes can be made without departing from the gist of the present invention.

The number of outboard motors is not limited to two, and alternatively, may be greater than two if so desired. In the aforementioned preferred embodiments, the controller 10 preferably receives the bow turning signal and the propulsion signal from the joystick 23. However, the controller 10 may alternatively receive the bow turning signal and the propulsion signal from another type of device. For example, the bow turning signal and the propulsion signal may be outputted from another type of input device operated by the operator such as, for example, a switch, a lever, a touchscreen, etc. Alternatively, the bow turning signal and the propulsion signal may be outputted from the controller to perform automatic control.

In the aforementioned preferred embodiments, in the composite operation, the operating amount obtained by converting the tilt amount of the joystick 23 and the operating amount obtained by converting the twist amount of the joystick 23 are combined, and the right and left outboard motors 1b and 1a are controlled based on the combined operating amount. However, the right and left outboard motors 1b and 1a may alternatively be controlled based on the tilt amount and the twist amount of the joystick 23 without executing the aforementioned conversions if so desired.

Figure 16:
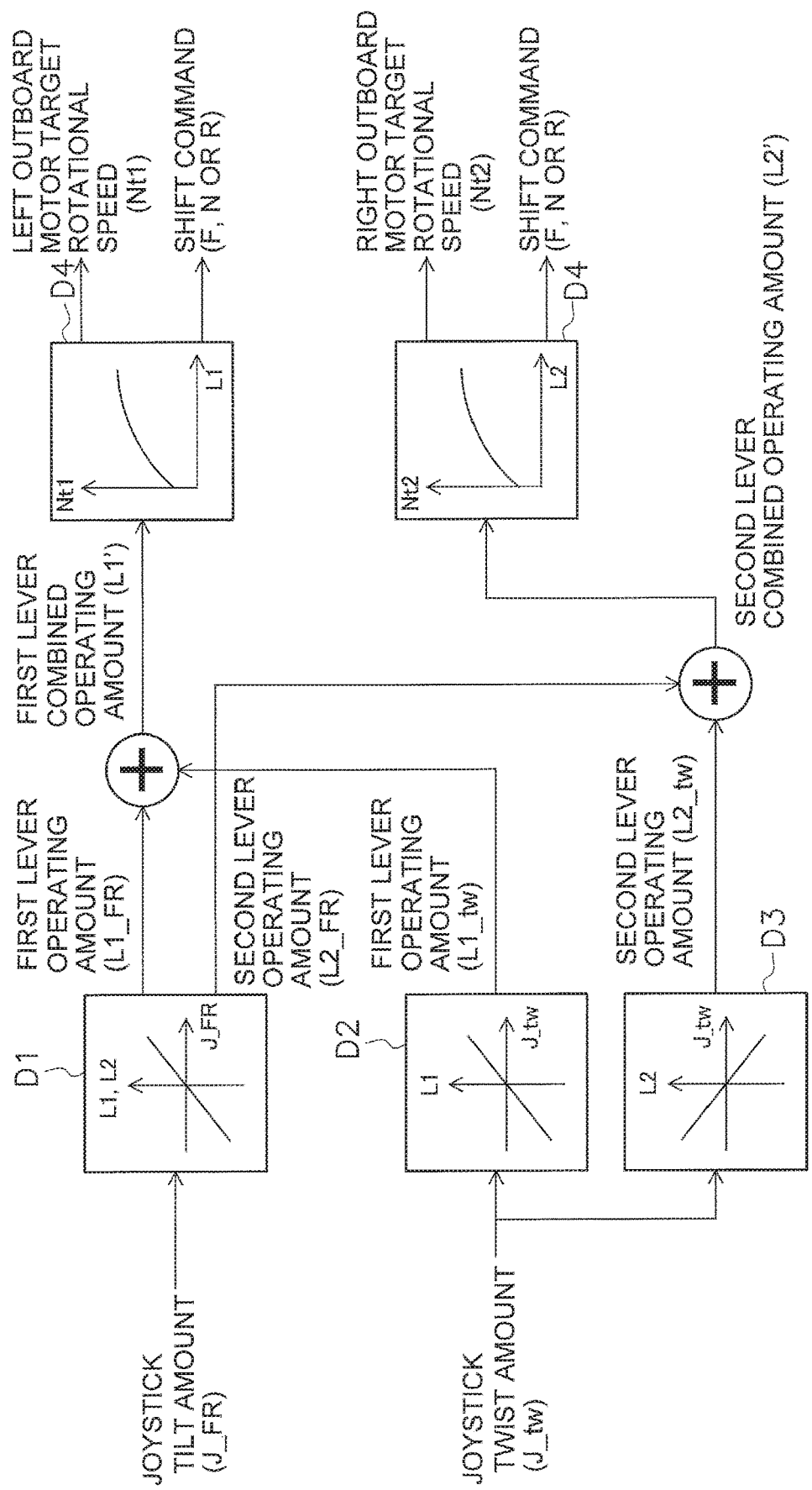
FIG. 16 is a diagram showing processing that determines command values given to the engines and the shift actuators according to another exemplary preferred embodiment of the present invention.

The controller 10 may determine target rotational speeds Nt1 and Nt2 instead of the aforementioned target throttle opening degrees Tr1 and Tr2. Further, the controller 10 may control the engine 2a of the left outboard motor 1a based on the target rotational speed Nt1. Also, the controller 10 may control the engine 2b of the right outboard motor 1b based on the target rotational speed Nt2. In this case, as shown in FIG. 16, the data D4 may define a relationship between the operating amount L1 of the first lever 22a and the target rotational speed Nt1 of the engine 2a and a relationship between the operating amount L2 of the second lever 22b and the target rotational speed Nt2 of the engine 2b. The controller 10 may determine the target rotational speed Nt1 of the engine 2a based on the combined operating amount L1' with reference to the data D4. The controller 10 may determine the target rotational speed Nt2 of the engine 2b based on the combined operating amount L2' with reference to the data D4.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A system for controlling a watercraft, the system comprising:
   a left outboard motor disposed on a port side of the watercraft;
   a right outboard motor disposed on a starboard side of the watercraft; and
   a controller that communicates with the left outboard motor and the right outboard motor; wherein
   the controller receives a bow turning signal and a propulsion signal, the bow turning signal causes the watercraft to turn a bow thereof, the propulsion signal causes the watercraft to move forward or rearward;
   when receiving the bow turning signal, the controller causes one of the right and left outboard motors to generate a forward thrust and simultaneously causes the other of the right and left outboard motors to generate a rearward thrust in accordance with a bow turning direction indicated by the bow turning signal;
   when a magnitude of a command value indicated by the propulsion signal falls within a first range in a composite operation in which the controller receives the bow turning signal and the propulsion signal, the controller controls a first outboard motor of the left outboard motor and the right outboard motor to increase a thrust in a propulsion direction indicated by the propulsion signal and simultaneously controls a second outboard motor of the left outboard motor and the right outboard motor to reduce a thrust in an opposite direction to the propulsion direction, where the first outboard motor generates the thrust in the propulsion direction while the second outboard motor generates the thrust in the opposite direction;
   when the magnitude of the command value falls within a second range greater than the first range in the composite operation, the controller controls the first outboard motor to make the thrust in the propulsion direction greater than when the magnitude of the command value falls within the first range and simultaneously maintains the second outboard motor in a neutral state; and
   when the magnitude of the command value falls within a third range greater than the second range in the composite operation, the controller controls the first outboard motor to make the thrust in the propulsion direction greater than when the magnitude of the command value falls within the second range and simultaneously controls the second outboard motor to generate a thrust in the propulsion direction.

2. The system according to claim 1, further comprising:
   a steering actuator that communicates with the controller to change rudder angles of the right and left outboard motors; wherein
   in the composite operation, the controller maintains the rudder angles of the first and second outboard motors constant as long as the magnitude of the command value falls within any of the first, second, and third ranges.

3. The system according to claim 1, further comprising:
   a joystick that communicates with the controller; wherein
   the joystick outputs the bow turning signal in accordance with a twist operation of the joystick and outputs the propulsion signal in accordance with a tilt operation of the joystick.

4. The system according to claim 1, wherein
   when the bow turning direction indicated by the bow turning signal is rightward, the controller causes the left outboard motor to generate the forward thrust and simultaneously causes the right outboard motor to generate the rearward thrust;
   when the magnitude of the command value indicated by the propulsion signal falls within the first range, the controller controls the left outboard motor to increase the forward thrust and simultaneously controls the right outboard motor to reduce the rearward thrust in a first composite operation in which the controller receives the bow turning signal and the propulsion signal, with the bow turning direction indicated by the bow turning signal being rightward and the propulsion direction indicated by the propulsion signal being forward;
   when the magnitude of the command value falls within the second range in the first composite operation, the controller controls the left outboard motor to make the forward thrust greater than when the magnitude of the command value falls within the first range and simultaneously maintains the right outboard motor in the neutral state; and
   when the magnitude of the command value falls within the third range in the first composite operation, the controller controls the left outboard motor to make the forward thrust greater than when the magnitude of the command value falls within the second range and simultaneously controls the right outboard motor to generate a forward thrust.

5. The system according to claim 1, wherein
   when the bow turning direction indicated by the bow turning signal is rightward, the controller causes the left outboard motor to generate the forward thrust and simultaneously causes the right outboard motor to generate the rearward thrust;
   when the magnitude of the command value indicated by the propulsion signal falls within the first range, the controller controls the right outboard motor to increase the rearward thrust and simultaneously controls the left outboard motor to reduce the forward thrust in a second composite operation in which the controller receives the bow turning signal and the propulsion signal, the bow turning direction indicated by the bow turning signal being rightward and the propulsion direction indicated by the propulsion signal being rearward;
   when the magnitude of the command value falls within the second range in the second composite operation, the controller controls the right outboard motor to make the rearward thrust greater than when the magnitude of the command value falls within the first range and simultaneously maintains the left outboard motor in the neutral state; and
   when the magnitude of the command value falls within the third range in the second composite operation, the controller controls the right outboard motor to make the rearward thrust greater than when the magnitude of the command value falls within the second range and simultaneously controls the left outboard motor to generate a rearward thrust.

6. The system according to claim 1, wherein
when the bow turning direction indicated by the bow turning signal is leftward, the controller causes the right outboard motor to generate the forward thrust and simultaneously causes the left outboard motor to generate the rearward thrust;
when the magnitude of the command value indicated by the propulsion signal falls within the first range, the controller controls the right outboard motor to increase the forward thrust and simultaneously controls the left outboard motor to reduce the rearward thrust in a third composite operation in which the controller receives the bow turning signal and the propulsion signal, with the bow turning direction indicated by the bow turning signal being leftward and the propulsion direction indicated by the propulsion signal being forward;
when the magnitude of the command value falls within the second range in the third composite operation, the controller controls the right outboard motor to make the forward thrust greater than when the magnitude of the command value falls within the first range and simultaneously maintains the left outboard motor in the neutral state; and
when the magnitude of the command value falls within the third range in the third composite operation, the controller controls the right outboard motor to make the forward thrust greater than when the magnitude of the command value falls within the second range and simultaneously controls the left outboard motor to generate a forward thrust.

7. The system according to claim 1, wherein
when the bow turning direction indicated by the bow turning signal is leftward, the controller causes the right outboard motor to generate the forward thrust and simultaneously causes the left outboard motor to generate the rearward thrust;
when the magnitude of the command value indicated by the propulsion signal falls within the first range, the controller controls the left outboard motor to increase the rearward thrust and simultaneously controls the right outboard motor to reduce the forward thrust in a fourth composite operation in which the controller receives the bow turning signal and the propulsion signal, with the bow turning direction indicated by the bow turning signal being leftward and the propulsion direction indicated by the propulsion signal being rearward;
when the magnitude of the command value falls within the second range in the fourth composite operation, the controller controls the left outboard motor to make the rearward thrust greater than when the magnitude of the command value falls within the first range and simultaneously maintains the right outboard motor in the neutral state; and
when the magnitude of the command value falls within the third range in the fourth composite operation, the controller controls the left outboard motor to make the rearward thrust greater than when the magnitude of the command value falls within the second range and simultaneously controls the right outboard motor to generate a rearward thrust.

8. A method of controlling a watercraft including a left outboard motor disposed on a port side of the watercraft and a right outboard motor disposed on a starboard side of the watercraft, the method comprising:
receiving a bow turning signal and a propulsion signal, the bow turning signal causing the watercraft to turn a bow thereof, the propulsion signal causing the watercraft to move forward or rearward;
causing one of the right and left outboard motors to generate a forward thrust and simultaneously causing the other one of the right and left outboard motors to generate a rearward thrust in accordance with a bow turning direction indicated by the bow turning signal when the bow turning signal is received;
controlling a first outboard motor of the right outboard motor and the left outboard motor to increase a thrust in a propulsion direction indicated by the propulsion signal and simultaneously controlling a second outboard motor of the right outboard motor and the left outboard motor to reduce a thrust in an opposite direction to the propulsion direction when a magnitude of a command value indicated by the propulsion signal falls within a first range in a composite operation in which the bow turning signal and the propulsion signal are received, where the first outboard motor generates the thrust in the propulsion direction while the second outboard motor generates the thrust in the opposite direction;
controlling the first outboard motor to make the thrust in the propulsion direction greater than when the magnitude of the command value falls within the first range and simultaneously maintaining the second outboard motor in a neutral state when the magnitude of the command value falls within a second range greater than the first range in the composite operation; and
controlling the first outboard motor to make the thrust in the propulsion direction greater than when the magnitude of the command value falls within the second range and simultaneously controlling the second outboard motor to generate a thrust in the propulsion direction when the magnitude of the command value falls within a third range greater than the second range in the composite operation.

9. The method according to claim 8, wherein
the watercraft further includes a steering actuator that changes rudder angles of the right and left outboard motors; and
the rudder angles of the first and second outboard motors are maintained constant as long as the magnitude of the command value falls within any of the first, second, and third ranges in the composite operation.

10. The method according to claim 8, wherein
the watercraft further includes a joystick, the method further comprising:
receiving the bow turning signal from the joystick in accordance with a twist operation of the joystick; and
receiving the propulsion signal from the joystick in accordance with a tilt operation of the joystick.

11. The method according to claim 8, further comprising:
causing the left outboard motor to generate the forward thrust and simultaneously causing the right outboard motor to generate the rearward thrust when the bow turning direction indicated by the bow turning signal is rightward;
controlling the left outboard motor to increase the forward thrust and simultaneously controlling the right outboard motor to reduce the rearward thrust when the magnitude of the command value indicated by the propulsion signal falls within the first range in a first composite operation in which the bow turning signal and the propulsion signal are received, with the bow turning direction indicated by the bow turning signal being rightward and the propulsion direction indicated by the propulsion signal being forward;

controlling the left outboard motor to make the forward thrust greater than when the magnitude of the command value falls within the first range and simultaneously maintaining the right outboard motor in the neutral state when the magnitude of the command value falls within the second range in the first composite operation; and controlling the left outboard motor to make the forward thrust greater than when the magnitude of the command value falls within the second range and simultaneously controlling the right outboard motor to generate a forward thrust when the magnitude of the command value falls within the third range in the first composite operation.

12. The method according to claim 8, further comprising:

causing the left outboard motor to generate the forward thrust and simultaneously causing the right outboard motor to generate the rearward thrust when the bow turning direction indicated by the bow turning signal is rightward;

controlling the right outboard motor to increase the rearward thrust and simultaneously controlling the left outboard motor to reduce the forward thrust when the magnitude of the command value indicated by the propulsion signal falls within the first range in a second composite operation in which the bow turning signal and the propulsion signal are received, with the bow turning direction indicated by the bow turning signal being rightward and the propulsion direction indicated by the propulsion signal being rearward;

controlling the right outboard motor to make the rearward thrust greater than when the magnitude of the command value falls within the first range and simultaneously maintaining the left outboard motor in the neutral state when the magnitude of the command value falls within the second range in the second composite operation; and controlling the right outboard motor to make the rearward thrust greater than when the magnitude of the command value falls within the second range and simultaneously controlling the left outboard motor to generate a rearward thrust when the magnitude of the command value falls within the third range in the second composite operation.

13. The method according to claim 8, further comprising:

causing the right outboard motor to generate the forward thrust and simultaneously causing the left outboard motor to generate the rearward thrust when the bow turning direction indicated by the bow turning signal is leftward;

controlling the right outboard motor to increase the forward thrust and simultaneously controlling the left outboard motor to reduce the rearward thrust when the magnitude of the command value indicated by the propulsion signal falls within the first range in a third composite operation in which the bow turning signal and the propulsion signal are received, with the bow turning direction indicated by the bow turning signal being leftward and the propulsion direction indicated by the propulsion signal being forward;

controlling the right outboard motor to make the forward thrust greater than when the magnitude of the command value falls within the first range and simultaneously maintaining the left outboard motor in the neutral state when the magnitude of the command value falls within the second range in the third composite operation; and controlling the right outboard motor to make the forward thrust greater than when the magnitude of the command value falls within the second range and simultaneously controlling the left outboard motor to generate a forward thrust when the magnitude of the command value falls within the third range in the third composite operation.

14. The method according to claim 8, further comprising:

causing the right outboard motor to generate the forward thrust and simultaneously causing the left outboard motor to generate the rearward thrust when the bow turning direction indicated by the bow turning signal is leftward;

controlling the left outboard motor to increase the rearward thrust and simultaneously controlling the right outboard motor to reduce the forward thrust when the magnitude of the command value indicated by the propulsion signal falls within the first range in a fourth composite operation in which the bow turning signal and the propulsion signal are received, with the bow turning direction indicated by the bow turning signal being leftward and the propulsion direction indicated by the propulsion signal being rearward;

controlling the left outboard motor to make the rearward thrust greater than when the magnitude of the command value falls within the first range and simultaneously maintaining the right outboard motor in the neutral state when the magnitude of the command value falls within the second range in the fourth composite operation; and controlling the left outboard motor to make the rearward thrust greater than when the magnitude of the command value falls within the second range and simultaneously controlling the right outboard motor to generate a rearward thrust when the magnitude of the command value falls within the third range in the fourth composite operation.

* * * * *